(12) United States Patent
Saine

(10) Patent No.: US 8,746,501 B2
(45) Date of Patent: Jun. 10, 2014

(54) PNEUMATICALLY ACTUATED LIQUID DISPENSING VALVE AND METHOD

(75) Inventor: Joel E. Saine, Dahlonega, GA (US)

(73) Assignee: Nordson Corporation, Westlake, OH (US)

( * ) Notice: Subject to any disclaimer, the term of this patent is extended or adjusted under 35 U.S.C. 154(b) by 55 days.

(21) Appl. No.: 13/285,732

(22) Filed: Oct. 31, 2011

(65) Prior Publication Data

US 2013/0105524 A1 May 2, 2013

(51) Int. Cl.
*B67B 7/00* (2006.01)
*B67D 3/00* (2006.01)
*B67D 7/06* (2010.01)
*B65D 47/00* (2006.01)
*F16K 1/00* (2006.01)
*F16K 15/00* (2006.01)
*F16K 31/00* (2006.01)

(52) U.S. Cl.
USPC .............. 222/1; 222/559; 222/518; 251/61.4; 251/321

(58) Field of Classification Search
CPC ..... B05B 1/2013; B05B 9/01; F16K 31/1262; F16K 31/126; B05C 5/0225
USPC .................. 222/504, 559, 146.5, 511, 518, 1; 251/61–61.5; 92/13.2, 90, 130 C, 98 R, 92/36, 40
See application file for complete search history.

(56) References Cited

U.S. PATENT DOCUMENTS

| | | | | |
|---|---|---|---|---|
| 862,867 A * | 8/1907 | Eggleston | ..................... | 417/390 |
| 1,217,344 A * | 2/1917 | Powers | ......................... | 137/495 |
| 1,236,216 A * | 8/1917 | Schuler | ........................ | 251/61.4 |
| 2,208,539 A * | 7/1940 | Brown | ............................... | 92/48 |
| 2,559,692 A * | 7/1951 | Whalen | ......................... | 137/204 |
| 3,550,625 A * | 12/1970 | Adams, Jr. | .................. | 137/614.2 |
| 3,884,446 A * | 5/1975 | Erickson | ...................... | 251/61.4 |
| 4,059,466 A * | 11/1977 | Scholl et al. | ..................... | 156/78 |
| 4,066,188 A * | 1/1978 | Scholl et al. | ................ | 222/146.5 |
| 4,113,152 A * | 9/1978 | Schmidt | ........................ | 222/485 |
| 4,783,046 A * | 11/1988 | Young et al. | ................. | 251/61.4 |
| 4,801,051 A * | 1/1989 | Lewis et al. | .................... | 222/309 |
| 5,762,315 A * | 6/1998 | Eggleston | ..................... | 251/61.4 |
| 5,979,864 A * | 11/1999 | Eggleston | ........................ | 251/58 |
| 6,060,125 A * | 5/2000 | Fujii | ..................... | 427/8 |
| 6,257,445 B1 * | 7/2001 | Means et al. | ....................... | 222/1 |
| 6,669,057 B2 * | 12/2003 | Saidman et al. | ........... | 222/146.5 |
| 7,614,529 B2 * | 11/2009 | Bolyard et al. | ............... | 222/504 |
| 2006/0097010 A1 * | 5/2006 | Riney | ......................... | 222/146.5 |

* cited by examiner

*Primary Examiner* — Paul R Durand
*Assistant Examiner* — Matthew Lembo
(74) *Attorney, Agent, or Firm* — Wood, Herron & Evans, L.L.P.

(57) ABSTRACT

A liquid dispensing valve includes a liquid dispensing portion with a liquid inlet, a liquid outlet, and a liquid passage communicating between the liquid inlet and liquid outlet. A valve member is mounted for movement relative to the liquid outlet between open and closed positions. An actuation portion is coupled with the liquid dispensing portion and includes an inflatable bladder structure. The inflatable bladder structure includes an interior adapted to be coupled in fluid communication with a source of positively pressurized air. The bladder structure may be expanded by the positively pressurized air to move the valve member to at least one of the open or closed positions from the other of the open or closed positions. Methods of dispensing liquid, such as hot melt adhesive, from the valve are also disclosed.

17 Claims, 4 Drawing Sheets

PNEUMATICALLY ACTUATED LIQUID DISPENSING VALVE AND METHOD

TECHNICAL FIELD

The invention generally relates to pneumatically actuated liquid dispensing valves, such as those designed to dispense liquid hot melt adhesives.

BACKGROUND

Pneumatically actuated liquid dispensing valves generally utilize a liquid dispensing portion including a liquid inlet for receiving liquid such as hot melt adhesive, and a liquid outlet for discharging the liquid in various forms such as beads, dots, swirled filaments or spray forms. The dispensing valve further includes a valve member, such as a valve stem or needle mounted for reciprocating movement between open and closed positions. An actuation portion includes a pneumatic actuator such as a piston coupled for movement with the valve stem. The piston resides in a piston chamber and a dynamic seal is positioned between the piston chamber and the liquid dispensing portion to prevent leakage of liquid into the piston chamber or leakage of pressurized air from the piston chamber into the liquid dispensing portion. The valve stem extends through the dynamic seal. Pressurized air is introduced into the piston chamber to move the piston and the attached valve stem from the open position to the closed position and/or vice versa. Conventional pneumatically actuated valves may be air-over-air type in which pressurized air is introduced into a lower portion of the piston chamber to raise the piston and valve stem while air is exhausted from the upper portion of the piston chamber, and pressurized air is introduced into the upper portion of the piston chamber to force the piston and valve stem downward as air is exhausted from the lower portion of the piston chamber. Alternatively, such valves may be of the spring return type in which pressurized air is used to open the valve and a spring is used to close the valve. The upward and downward movements of the valve stem may open or close the valve depending on the design of the valve stem and the valve seat.

The dynamic seal associated with present dispensing valves results in friction and wear. This can lead to eventual leakage and the need to replace the seal or the entire valve. The friction between the dynamic seal and the valve stem can slow the response of the valve stem movement to the applied pneumatic pressure. Another possibility with current pneumatic dispensing valves is bleed over of pneumatic pressure from one side of the piston to the other. This can also adversely affect the performance of the valve.

It would be desirable to provide a liquid dispensing valve and method for pneumatically operating such a valve that addresses issues associated with using one or more dynamic seals.

SUMMARY

The present invention generally provides a liquid dispensing valve including a liquid dispensing portion with a liquid inlet for receiving the liquid and a liquid outlet for discharging the liquid. A liquid passage communicates between the liquid inlet and the liquid outlet. A valve member is mounted for movement relative to the liquid outlet between open and closed positions. An actuation portion is coupled with the liquid dispensing portion and includes an inflatable bladder structure. The inflatable bladder structure includes at least one interior adapted to be coupled in fluid communication with a source of positively pressurized air and expanded by the positively pressurized air to move the valve member to at least one of the open or closed positions from the other of the open or closed positions. In two different illustrative embodiments, the bladder structure comprises either a single inflatable bladder for moving the valve member in a single direction, or two bladders for respectively moving the valve member in two different directions.

In one embodiment, a liquid dispensing valve is provided with the liquid dispensing portion as discussed above and a valve seat located in the liquid passage between the liquid inlet and the liquid outlet. The valve member comprises a valve stem with first and second ends and mounted for reciprocating movement in the liquid passage between the open and closed positions. The first end engages the valve seat in the closed position to prevent liquid flow from the liquid outlet and disengages from the valve seat in the open position to allow liquid flow from the liquid outlet. The inflatable bladder structure of the actuation portion further comprises an annular structure with a central opening that receives the second end of the valve stem.

In other aspects, the liquid dispensing valve may further comprise a biasing return mechanism coupled with the valve member or valve stem. Inflating the bladder structure moves the valve member from the closed position to the open position and the biasing return mechanism moves the valve member from the open position to the closed position when pressurized air is exhausted from the interior of the bladder structure.

In another embodiment, the inflatable bladder structure further comprises a first expandable portion having a first interior and configured to move the valve member from the open position to the closed position upon introduction of the positively pressurized air into the first interior, and a second expandable portion having a second interior and configured to move the valve member from the closed position to the open position upon introduction of the positively pressurized air into the second interior. The actuation portion can further comprise a chamber and the inflatable bladder structure can be mounted in the chamber. The chamber includes an air inlet adapted to be coupled in fluid communication with the source of positively pressurized air and also to the interior or interiors of the bladder structure. Pressurizing the interior or interiors with the positively pressurized air expands the bladder structure to move the valve member to at least on one of the open or closed positions.

The invention further provides a method of dispensing liquid from a valve including a liquid dispensing portion with a liquid inlet and a liquid outlet, a valve member mounted for movement between open and closed positions, and an inflatable bladder structure with an interior. The method comprises introducing pressurized liquid through the liquid inlet, introducing pressurized air into the interior of the bladder structure to expand the bladder structure, moving the valve member from the closed position to the open position with the expanding bladder structure, and dispensing the pressurized liquid from the liquid outlet when the bladder structure is expanded and the valve member is in the open position.

The method can comprise additional variations and steps. For example, the valve may further include a spring return mechanism coupled with the valve member and the method may further comprise exhausting the pressurized air from the interior of the bladder structure, and moving the valve member from the open position to the closed position with the spring return mechanism when exhausting the pressurized air from the interior of the bladder structure.

The inflatable bladder structure may include first and second expandable portions having respective first and second interiors. In this embodiment, the method further comprises introducing pressurized air into the first interior of the first expandable portion to expand the first expandable portion. The valve member is moved from the closed position to the open position while expanding the first expandable portion. Pressurized liquid is dispensed from the liquid outlet when the first expandable portion is expanded and the valve member is in the open position. Pressurized air is then exhausted from the first interior and pressurized air is introduced into the second interior of the second expandable portion to expand the second expandable portion. The valve member is then moved from the open position to the closed position while expanding the second expandable portion. Dispensing of the pressurized liquid is stopped when the second expandable portion is expanded and the valve member is in the closed position. As an alternative to the dual expandable portion design, the valve stem may be moved to the closed position with a spring instead of with a second expandable portion. The inflatable bladder structure may be mounted within a chamber and inflating the bladder structure may comprise introducing the air into the interior or interiors of the bladder structure through an inlet in the chamber. The liquid utilized in the method may be of a variety of forms, such as liquid hot melt adhesives or other liquids.

Various additional features and advantages will become readily apparent to those of ordinary skill in the art upon review of the following detailed description of the illustrative embodiments, taken in conjunction with the accompanying drawings.

DETAILED DESCRIPTION

Figure 1:
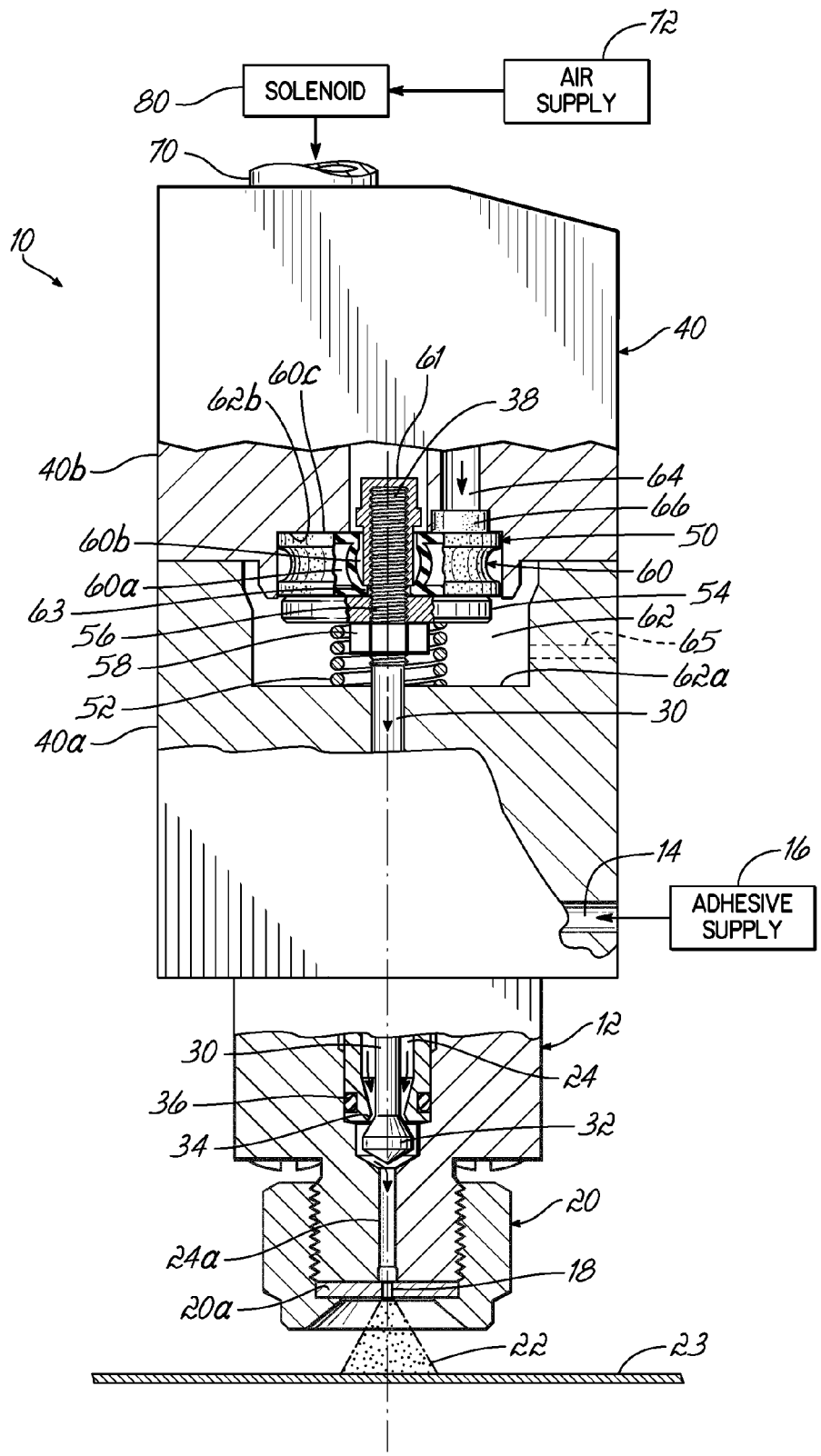
FIG. 1 is a schematic view illustrating a first embodiment of a liquid dispensing valve taken partially in cross section along a longitudinal axis thereof, and showing the valve in the open position.
Figure 2:
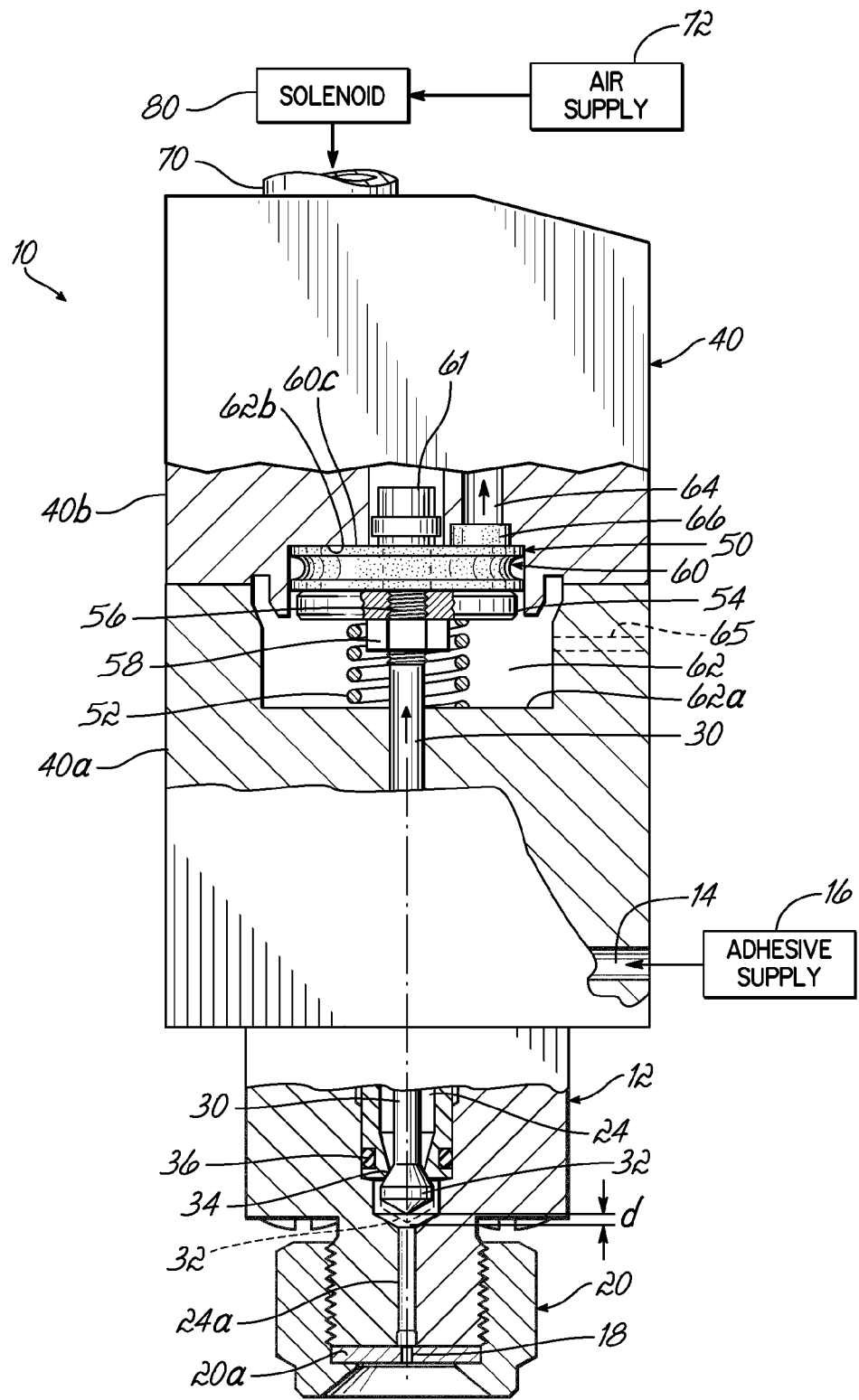
FIG. 2 is a view of the valve illustrated in FIG. 1, but showing the valve in the closed position.

FIGS. 1 and 2 illustrate a first embodiment of a liquid dispensing valve 10. The valve 10 includes a liquid dispensing portion 12 with a liquid inlet 14 for receiving liquid, such as a hot melt adhesive, from a pressurized supply 16. The liquid dispensing portion 12 further includes a liquid outlet 18 associated with an insert 20a of a nozzle 20 for discharging the liquid 22 onto a substrate 23. It will be appreciated that the nozzle 20 is schematically illustrated and may take a variety of forms and discharge liquid in a variety of manners. When dispensing liquid hot melt adhesive, for example, swirl patterns, bead patterns, dots and other spray patterns may be discharged. A liquid passage 24 communicates between the liquid inlet 14 and the liquid outlet 18. A valve member 30 is mounted for movement relative to the liquid outlet 18 between open and closed positions, respectively illustrated in FIGS. 1 and 2. More specifically, the valve member 30 in this embodiment is a valve stem including a distal or lower end 32 that interacts with a valve seat 34 located in the liquid dispensing portion 12. In the embodiments shown, the valve member 30 and its tip or distal end 32 are shown as a "snuff back" type. It will be appreciated that any other desired design may be used instead, including the type in which the valve stem moves distally to close against a valve seat and proximally to open. The valve seat 34 is shown fixed within the liquid dispensing portion 12 and sealed with an O-ring 36. The valve seat 34 defines a portion of the liquid passage 24 communicating with the adhesive supply 16 and the liquid inlet 14. An upper end 38 of the valve stem 30 is operatively coupled with an actuation portion 40 of the valve 10. In this illustrative embodiment, the actuation portion 40 generally includes a body 40a secured to a cap 40b. A seal (not shown) is positioned around the valve stem 30 to seal off the liquid dispensing portion 12 from the actuation portion 40. The actuation portion 40 is also coupled with the liquid dispensing portion 12 as schematically illustrated, and the connection (not shown) may be made in any suitable manner. The valve stem 30 is supported laterally or side-to-side during its reciprocating movement, such as by supporting structure (not shown) associated with the liquid dispensing portion 12.

The actuation portion 40 more specifically comprises an inflatable bladder structure 50 operatively coupled to the valve stem 30. The actuation portion further comprises a biasing return mechanism in the form of a return spring 52. A disc 54 is rigidly affixed to the valve stem 30, such as by threads 56 on the upper or proximal end 38 of the valve stem 30 and a securing nut 58. In this embodiment, the bladder structure 50 comprises a single, annular bladder 60 having an annular interior 60a for receiving pressurized air and a central hole 60b through which the valve stem upper end 38 extends. A retainer 61 is secured to the valve stem 30 and engages a lower lip 63 of the bladder 50 to hold the bladder 60 in place at the upper end 38. The bladder 60 is formed from a resilient, flexible material such as natural or synthetic rubber. The disc 54, bladder 60 and return spring 52 are contained or housed within a chamber 62. A vent 65 communicates with the chamber. The return spring 52 is mounted so as to receive the valve stem 30 and nut 58 and extend between the underside of the disc 54 and the bottom surface 62a of the chamber. The chamber 62 communicates with an air passage 64 in the cap 40b. A port 66 of the bladder 60 communicates with the air passage 64. The air passage 64 further communicates with a fitting 70 of the actuation portion 40 and a pressurized air supply 72, such as common "shop" air, e.g., at 80 psi. A three-way solenoid valve 80 is used to control the supply and exhaust of pressurized air to/from the bladder 60. Specifically, as shown in FIG. 1, when the solenoid valve 80 is activated, pressurized air will flow into the fitting 70, through the air passage 64 and into the chamber 62. This air will be introduced into the interior 60a of the bladder 60 through the port 66 of the bladder 60. This will expand the bladder 60 as shown in FIG. 1 (and as compared to FIG. 2). Because an upper surface 60c of the bladder 60 is stopped against an upper interior surface 62b of the chamber 62, the bladder 60 will expand and extend downwardly against the disc 54 and move the disc 54 as well as the attached valve stem 30 downward against the bias of the spring 52. This compresses the spring 52 and disengages the distal end 32 of the valve stem 30 from the valve seat 34. Disengagement of the distal end 32 of the valve stem 30 from the valve seat 34 as shown in FIG. 1 will then cause the pressurized adhesive 22 to flow past the valve seat 34 and into a downstream portion 24a of the liquid passage 24 and through the liquid outlet 18 onto the substrate 23.

As shown in FIG. 2, when the solenoid 80 is deactivated or otherwise operated to exhaust the pressurized air from the bladder 60, this will cause the force created by the expanded bladder 60 to decrease and be overcome by the force of the compressed spring 52. The spring 52 will expand and push upwardly on the disc 54, compressing and contracting the bladder 60, and moving the disc 54 as well as the attached valve stem 30 upwardly until the distal end 32 of the valve stem 30 engages with the valve seat 34. This engagement of the valve stem 30 with the valve seat 34 closes the valve 10 and shuts off the flow of liquid 22 from the outlet 18. Because the pressurized air is contained within the bladder 60, there is no need for a robust dynamic seal between the chamber 62 and the liquid passage 24. It will be understood that there may still be a dynamic seal (not shown) that prevents significant migration of liquid 22 from the dispensing portion 12 into the chamber 62.

Figure 3:
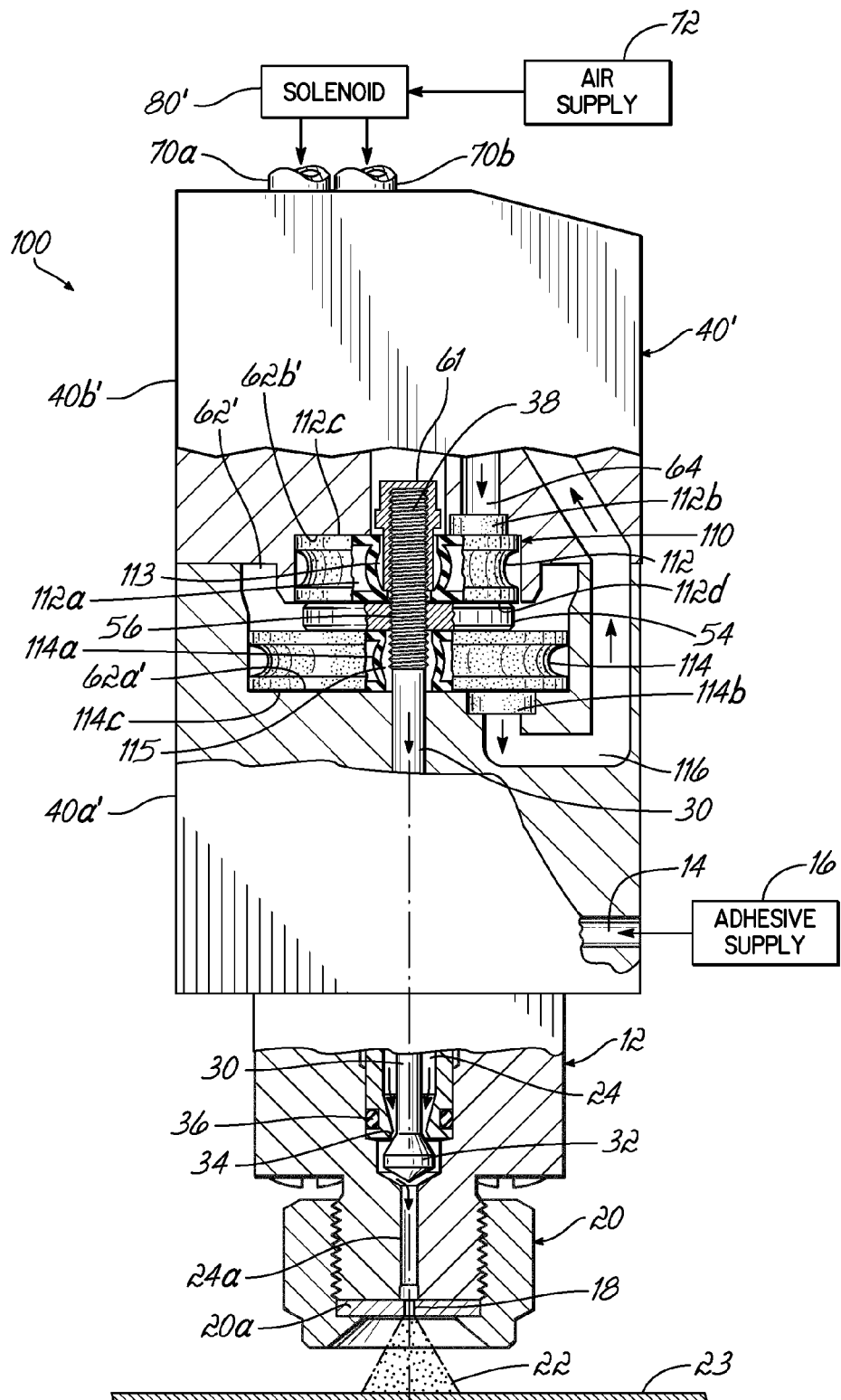
FIG. 3 is a view similar to FIG. 1, but illustrating an alternative embodiment of the actuation portion of the valve, and showing the valve in the open position.
Figure 4:
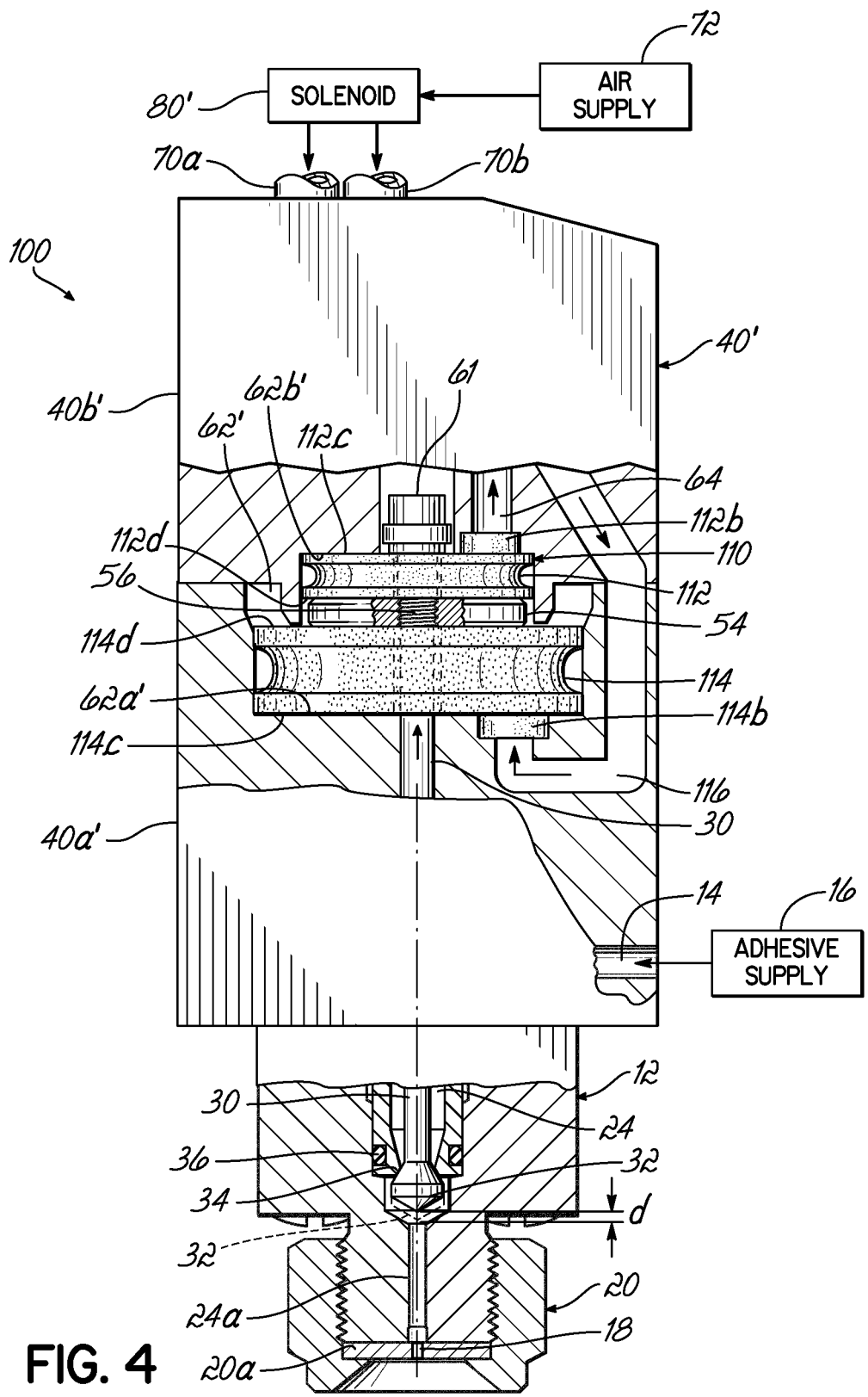
FIG. 4 is a view of the valve illustrated in FIG. 3, but showing the valve in the closed position.

FIGS. 3 and 4 illustrate another embodiment of a valve 100 similar to the valve 10 described in connection with FIGS. 1 and 2, but having various differences as will be described further below. In this embodiment, like reference numerals indicate like elements of structure between the first and second embodiments as well as like function and, therefore, additional description of various structure and function is not necessarily repeated. Reference numerals with prime (') marks indicate elements similar to those having the same numeral in FIGS. 1 and 2, with differences either explained below or readily apparent from the drawings. In this embodiment, a bladder structure 110 further comprises first and second bladders 112, 114 respectively positioned above and below the disc 54. The pressurized air 72 is supplied to these bladders 112, 114 by a four way solenoid valve 80' through respective ports 70a, 70b. Each of these bladders 112, 114 is configured as an annular, sealed unit with annular interiors 112a, 114a and ports 112b, 114b, and outer surfaces 112c, 114c that bear against respective upper and lower chamber walls 62b' and 62a'. A similar cylinder nut (not shown) to nut or retainer 61 may be threaded onto the valve stem end 38, assuming the threaded portion is lengthened, to retain the lower bladder 114. Each bladder 112, 114 has a central opening 113, 115 receiving the valve stem 30. As with the first embodiment, bladders 112, 114 are preferably formed from a resilient flexible material such as natural or synthetic rubber. The second or lower bladder 114 may replace the return spring 52 of the first embodiment. However, in practice, a return spring will typically be used to ensure valve closure. Such a spring could be a separate component or molded into bladder 114. The illustrated positions of the bladders 112, 114, with the larger bladder 114 on the bottom may be reversed depending on the valve design and/or desired effects. In addition, the bladders 112, 114 may be of identical size instead of different sizes as shown. Introduction of pressurized air into the interior 112a of the upper bladder 112 through port 112b and air passage 64 as air is exhausted from the interior 114a of the lower bladder 114 through port 114b and a passage 116 will force the disc 54 and attached valve stem 30 downwardly to disengage the distal end 32 of the valve stem 30 from the valve seat 34. Specifically, the bladder 112 will expand downwardly as upper surface 112c bears against stationary chamber wall 62b' and a lower surface 112d pushes against and moves the disc 54. This results in the flow of adhesive or other liquid 22 past the valve seat 34 through the liquid passage portion 24a and the liquid outlet 18, in a manner similar to the first embodiment.

In order to close the valve 100, air is exhausted from the interior 112a of the upper bladder 112 by actuation of the solenoid 80 as air is introduced into the interior 114a of the lower bladder 114 to expand this lower bladder 114 as shown in FIG. 4. Specifically, air will exhaust through port 112b and passage 64 as pressurized air is introduced through passage 116 and port 114b. The expansion of the lower bladder 114 as the upper bladder 112 contracts will push the disc 54 and the valve stem 30 connected thereto upwardly as the lower bladder surface 114c bears against the lower chamber surface 62a' and upper bladder surface 114d bears against the disc 54. The expanding bladder 114 will move the disc 54 and attached valve stem 30 until the distal end 32 of the valve stem 30 engages with the valve seat 34. This closes the valve 100 and stops the flow of liquid 22 through the liquid passage 24 past the valve seat 34 and stops the discharge of liquid 22 from the outlet 18. Again, since the pressurized air is being introduced into self-contained bladders 112, 114, there is no need for robust dynamic sealing between the liquid dispensing portion 12 and the air actuating portion 40' of the valve 100.

While the present invention has been illustrated by a description of various preferred embodiments and while these embodiments have been described in some detail, it is not the intention of the Applicants to restrict or in any way limit the scope of the appended claims to such detail. Additional advantages and modifications will readily appear to those skilled in the art. The various features of the invention may be used alone or in any combination depending on the needs and preferences of the user. This has been a description of the present invention, along with the preferred methods of practicing the present invention as currently known. However, the invention itself should only be defined by the appended claims.

What is claimed is:

1. A hot melt adhesive dispensing valve, comprising:
a hot melt adhesive dispensing portion including a hot melt adhesive inlet for receiving the hot melt adhesive, a hot melt adhesive outlet for discharging the hot melt adhesive and a hot melt adhesive passage communicating between said hot melt adhesive inlet and said hot melt adhesive outlet;
a valve member mounted for movement relative to said hot melt adhesive outlet between open and closed positions; and
an actuation portion coupled with said hot melt adhesive dispensing portion and including an inflatable bladder structure, said inflatable bladder structure including an interior adapted to be coupled in fluid communication with a source of positively pressurized air and expanded by the positively pressurized air to move the valve member to at least one of the open or closed positions from the other of the open or closed positions, said inflatable bladder structure including a top, a bottom and a side wall extending between the top and the bottom, wherein the bottom is operatively coupled to the valve member and the side wall curves convexly toward the interior between the top and the bottom.

2. The hot melt adhesive dispensing valve of claim 1, further comprising a valve seat in said hot melt adhesive dispensing portion, wherein said valve member further comprises a valve stem having first and second ends, said first end engaged with said valve seat in the closed position, and said inflatable bladder structure further comprises an annular member positioned around the second end of the valve stem.

3. The hot melt adhesive dispensing valve of claim 1, further comprising a biasing return mechanism coupled with said valve member, wherein inflating said bladder structure moves said valve member from the closed position to the open position and said biasing return mechanism moves said valve member from the open position to the closed position when pressurized air is exhausted from the interior of the bladder structure.

4. The hot melt adhesive dispensing valve of claim 1, wherein said inflatable bladder structure further comprises:
  a first expandable portion having a first interior and configured to move said valve member from the open position to the closed position upon introduction of the positively pressurized air into the first interior; and
  a second expandable portion having a second interior and configured to move said valve member from the closed position to the open position upon introduction of the positively pressurized air into the second interior.

5. The hot melt adhesive dispensing valve of claim 4, wherein the first expandable portion has a first diameter and the second expandable portion has a second diameter, and the first diameter is different than the second diameter.

6. The hot melt adhesive dispensing valve of claim 4, further comprising a disc, and wherein the first and second expandable portions are spaced from one another by said disc.

7. The hot melt adhesive dispensing valve of claim 1, wherein said actuation portion further comprises a chamber and said inflatable bladder structure is mounted within said chamber, said chamber including an air inlet adapted to be coupled in fluid communication with the source of positively pressurized air, and said interior communicates with said air inlet, wherein pressurizing said interior with the positively pressurized air expands said bladder structure.

8. The hot melt adhesive dispensing valve of claim 1, further comprising a valve seat in said hot melt adhesive dispensing portion, wherein said valve member further comprises a valve stem having first and second ends and mounted for reciprocating movement to the open position with the first end disengaged from the valve seat and to the closed position with the first end engaged against the valve seat.

9. A hot melt adhesive dispensing valve, comprising:
  a hot melt adhesive dispensing portion including a hot melt adhesive inlet for receiving the hot melt adhesive, a hot melt adhesive outlet for discharging the hot melt adhesive, a hot melt adhesive passage communicating between said hot melt adhesive inlet and said outlet, and a valve seat located in the hot melt adhesive passage between said hot melt adhesive inlet and said hot melt adhesive outlet;
  a valve stem having first and second ends and mounted for reciprocating movement in the hot melt adhesive passage between open and closed positions, said first end engaging said valve seat in the closed position to prevent hot melt adhesive flow from said hot melt adhesive outlet and disengaging from said valve seat in the open position to allow hot melt adhesive flow from said outlet; and
  an actuation portion coupled with said hot melt adhesive dispensing portion and including an annular, inflatable bladder structure with a central opening receiving said second end of said valve stem, said bladder structure including an interior adapted to be coupled in fluid communication with a source of positively pressurized air, wherein introducing the positively pressurized air into the interior of said bladder structure expands the bladder structure and moves said valve stem from the closed position to the open position, said inflatable bladder structure including a top, a bottom and a side wall extending between the top and the bottom, wherein the bottom is operatively coupled to the valve member and the side wall curves convexly toward the interior between the top and the bottom.

10. The hot melt adhesive dispensing valve of claim 9, further comprising a spring return mechanism coupled with said valve stem, wherein said spring return mechanism moves said valve stem from the open position to the closed position when positively pressurized air is exhausted from the interior of said bladder structure.

11. The hot melt adhesive dispensing valve of claim 9, wherein said annular, inflatable bladder structure further comprises:
  a first annular, expandable portion having a first interior and configured to move said valve stem from the open position to the closed position upon introduction of the positively pressurized air into the first interior; and
  a second annular, expandable portion having a second interior and configured to move said valve stem from the closed position to the open position upon introduction of the positively pressurized air into the second interior.

12. The hot melt adhesive dispensing valve of claim 9, wherein said actuation portion further comprises a chamber and said inflatable bladder structure is mounted within said chamber, said chamber including an air inlet adapted to be coupled in fluid communication with the source of positively pressurized air, and said interior communicates with said air inlet, wherein pressurizing said interior with the positively pressurized air expands said bladder structure.

13. A method of dispensing hot melt adhesive from a valve including a hot melt adhesive dispensing portion with a hot melt adhesive inlet and a hot melt adhesive outlet, a valve member mounted for movement between open and closed positions, and an inflatable bladder structure with an interior, comprising the steps of:
  introducing pressurized hot melt adhesive through the hot melt adhesive inlet;
  introducing pressurized air into the interior of the bladder structure to cause the bladder structure to undergo expansion and thereby move the valve member from the closed position to the open position, the interior defined by a side wall of the bladder structure which extends from a top of the bladder structure to a bottom of the bladder structure and curves convexly toward the interior between the top and the bottom; and
  dispensing the pressurized hot melt adhesive from the hot melt adhesive outlet when the bladder structure is expanded and the valve member is in the open position.

14. The method of claim 13, wherein the valve further includes a spring return mechanism coupled with the valve member, and the method further comprises:
  exhausting the pressurized air from the interior of the bladder structure; and
  contracting the bladder structure with the spring return mechanism when exhausting the pressurized air from the interior of the bladder structure to move the valve member from the open position to the closed position.

15. The method of claim 13, the method further comprising the step of:
  introducing pressurized air into a first interior of a first expandable portion to expand the first expandable portion;
  moving the valve member from the closed position to the open position while expanding the first expandable portion;
  dispensing the pressurized hot melt adhesive from the hot melt adhesive outlet when the first expandable portion is expanded and the valve member is in the open position;
  exhausting the pressurized air from the first interior;
  introducing pressurized air into a second interior of a second expandable portion to expand the second expandable portion;

moving the valve member from the open position to the closed position while expanding the second expandable portion; and stopping the dispensing of the pressurized hot melt adhesive from the hot melt adhesive outlet when the second expandable portion is expanded and the valve member is in the closed position.

16. The method of claim 13, further comprising the step of:

moving the valve member to the closed position with a spring.

17. The method of claim 13, further comprising:

introducing positively pressurized air into the interior of the bladder structure through an air inlet to expand the bladder structure.

* * * * *